United States Patent [19]

Duda

[11] Patent Number: 4,634,172
[45] Date of Patent: Jan. 6, 1987

[54] FLEXIBLE HINGE RAIN SEALING MECHANISM

[76] Inventor: Henry J. Duda, 1884 West Palm, Mount Prospect, Ill. 60056

[21] Appl. No.: 802,816

[22] Filed: Nov. 29, 1985

[51] Int. Cl.[4] ............................................... B60P 3/34
[52] U.S. Cl. ..................................... 296/163; 160/66; 160/235; 135/89
[58] Field of Search ................. 296/163, 172; 135/89; 160/61, 66, 67, 235, 229 R, 231 A, 236

[56] References Cited

U.S. PATENT DOCUMENTS

| | | | |
|---|---|---|---|
| 2,189,567 | 2/1940 | Miller . | |
| 2,423,402 | 7/1947 | Olsen | 135/89 |
| 2,720,885 | 10/1955 | Legg | 135/89 |
| 2,787,321 | 4/1957 | Dietz | 160/47 |
| 2,950,727 | 8/1960 | Dunn | 160/89 |
| 3,324,869 | 6/1967 | Duda | 135/89 |
| 3,720,438 | 3/1973 | Johnson et al. | 296/163 |
| 3,826,271 | 7/1974 | Sattler et al. | 135/89 |
| 4,077,419 | 3/1978 | Lux | 135/89 |
| 4,195,877 | 4/1980 | Duda | 296/172 |
| 4,331,169 | 5/1982 | Bonser | 135/89 |
| 4,576,192 | 3/1986 | Duda | 135/89 |

*Primary Examiner*—Robert R. Song
*Attorney, Agent, or Firm*—Emrich & Dithmar

[57] ABSTRACT

A recreational vehicle which has a first longitudinally extending rail C-shaped in transverse cross-section is combined with a metal cover for a roll-up awning having a second longitudinally extending rail C-shaped in transverse cross-section. A waterproof connector between the vehicle and the metal cover includes a pair of rods, each rod being capable of fitting within one of the first and second C-shaped rails, a synthetic organic resin strip wrapped around each rod forming a flexible multi-ply connection between the rods extending substantially the entire length thereof and forming a watertight hinge therebetween. Water is then prevented from flowing between the recreational vehicle and the metal cover for the roll-up awning when the awning is extended and the synthetic organic resin strip is under tension connecting the recreational vehicle and the roll-up awning metal cover.

16 Claims, 4 Drawing Figures

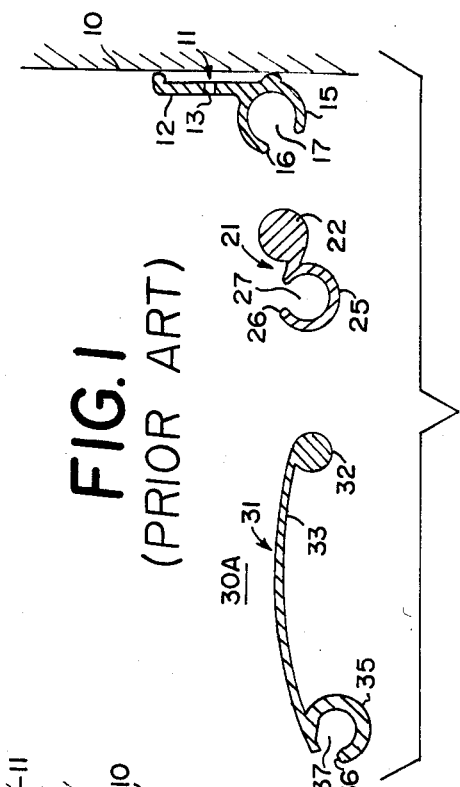
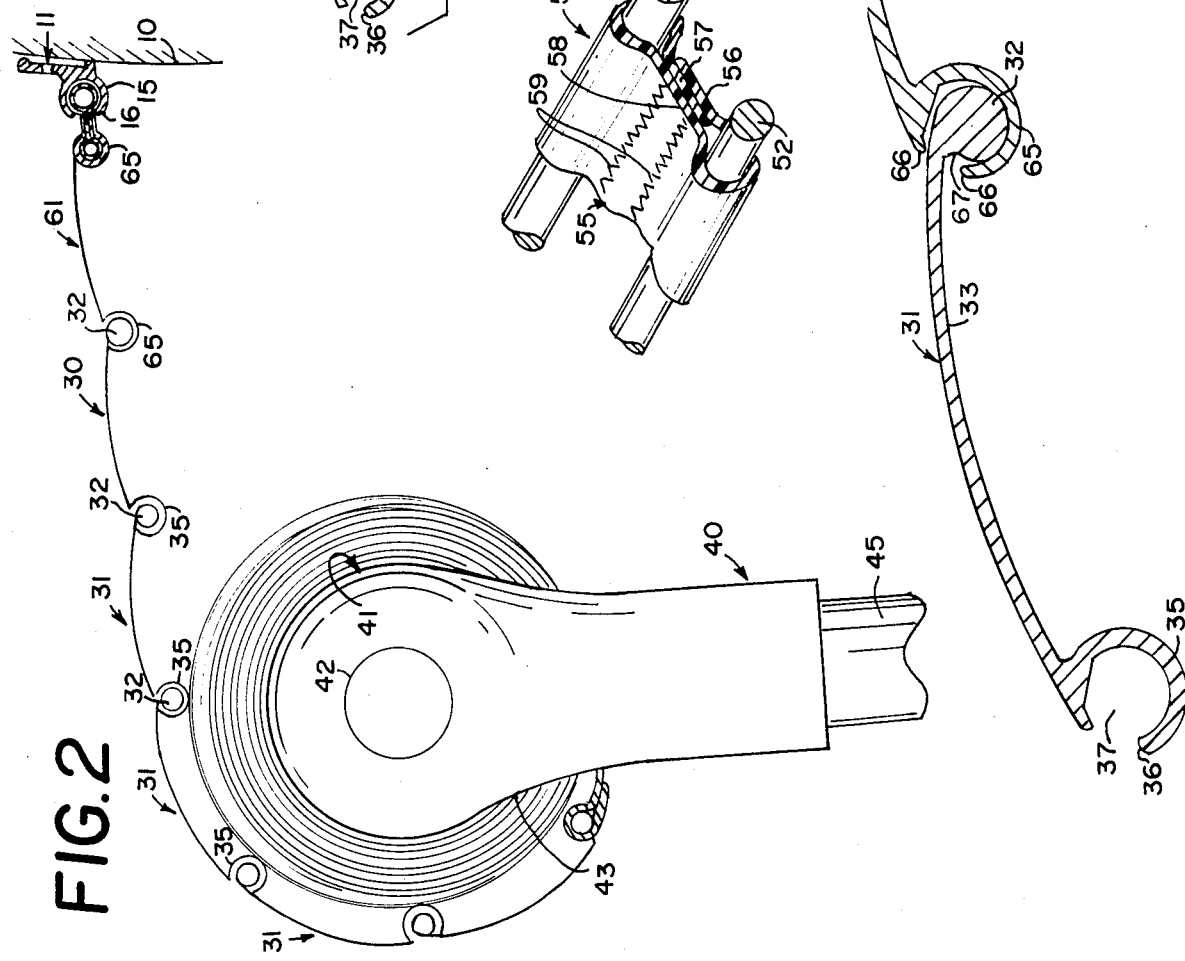

FLEXIBLE HINGE RAIN SEALING MECHANISM

BACKGROUND OF THE INVENTION

This invention relates to a water-tight connector for connecting a metal awning cover to the wall of a vehicle particularly an RV or trailer-type vehicle. It has long been recognized that roll-up awnings of the type shown and described in my prior U.S. Pat. No. 3,324,869 issued June 13, 1967 and U.S. Pat. No. 4,195,877, issued Apr. 1, 1980, the disclosures of which are incorporated herein by reference, have been useful in the recreational vehicle field. Particularly when trailer homes or recreational vehicles are parked at campsites, there is a need for a shady area in which to relax or a protected area in which to cook or the like in the event of inclement weather. A spring loaded roll-up awning of the type disclosed in my patent has long been used in the field and found sufficient to fulfill its intended purpose.

In my prior patent, there was disclosed a metal cover for a roll-up awning and although not disclosed therein, a metal cover comprised of a plurality of slats hingedly connected by one to the other has been used for many years. The slatted metal cover is generally connected to a railing mounted directly to the wall of the vehicle, which railing is C-shaped in transverse cross-section. Although the slatted awning cover sold for almost fifteen years has achieved substantial distinction in the field and has been satisfactory for its intended purpose, there is one significant problem with the slatted metal cover that has not heretofore been solved. Connection of the slatted metal cover to the vehicle wall has heretofore been accomplished by means of a metal fitting. The fitting serves to connect the rail on the vehicle with the innermost slat of the slatted metal cover; however, because of its construction and its metal to metal contact, there has been a problem of water seepage between the vehicle wall and the innermost slat in the slatted metal cover. This problem, although existing for fifteen years, has not satisfactorily been solved until the present invention.

SUMMARY OF THE INVENTION

The principal object of the present invention is to provide a connector for connecting a metal awning cover to a vehicle which provides a watertight seal therebetween.

Another object of the present invention is to provide a flexible connector for connecting a metal awning cover to a vehicle, comprising a flexible water-impervious strip, means for connecting one end of the strip to the vehicle, and means for connecting the other end of the strip to the metal awning cover, whereby when the awning is in use or in an extended position the flexible strip is under tension providing a water-tight seal between the awning cover and the recreational vehicle.

Still another object of the present invention is to provide in a recreational vehicle having a first longitudinally extending rail C-shaped in transverse cross-section and a roll-up awning having a metal cover with a second longitudinally extending rail C-shaped in transverse cross-section, the combination therewith of a waterproof connector, the connector comprising a pair of rods, each rod being capable of fitting within one of the first and second C-shaped rails, a flexible water-impervious fabric connecting the pair of rods constructed and arranged to provide a watertight connection between the first and second C-shaped rails when the fabric is under tension, whereby water is prevented from flowing between the recreational vehicle and the metal cover for the roll-up awning when the awning is extended and the flexible water-impervious fabric is under tension connecting the recreational vehicle and the roll-up awning metal cover.

Yet another object of the present invention is to provide in a recreational vehicle having a first longitudinally extending rail C-shaped in transverse cross-section, the combination therewith of a metal cover for a roll-up awning, a second longitudinally extending rail C-shaped in transverse cross-section on the metal cover, a waterproof connector including a pair of rods, each rod being capable of fitting within one of the first and second C-shaped rails, a synthetic organic resin strip wrapped around each rod forming a flexible multi-ply connection between the rods extending substantially the entire length thereof and forming a watertight hinge therebetween, whereby water is prevented from flowing between the recreational vehicle and the metal cover for the roll-up awning when the awning is extended and the synthetic organic resin strip is under tension connecting the recreational vehicle and the roll-up awning metal cover.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is an exploded sectional view of the prior art connection between a recreational vehicle wall having a rail mounted thereon and the innermost slat in a slatted metal awning cover;

FIG. 2 is a side elevational view of the water-tight connection of the present invention showing the invention in place between the slatted metal cover and a recreational vehicle.

FIG. 3 is an enlarged view of a portion of the water-tight connector; and

FIG. 4 is an enlarged sectional view like FIG. 1 illustrating the invention when the slatted metal cover is in its extended position.

DESCRIPTION OF THE PREFERRED EMBODIMENT

FIG. 1 shows the prior art construction including a recreational vehicle side wall 10 having a fixture 11 connected thereto. The fixture 11 consists of a longitudinally extending mounting plate 12 having a plurality of apertures 13 therethrough for a mounting device such as a metal screw (not shown) or the like. The mounting plate 12 has a longitudinally extending rail 15 at the end thereof which is C-shaped in transverse cross-section and terminates at the end portions 16 forming an opening 17. The rail 15 extends longitudinally along the side wall 10 of the recreational vehicle and is usually formed in one piece with the mounting plate 12 so as to form fixture 11 as a single extrusion. A connecting key link 21 is also a one-piece extrusion of a metal such as aluminum, as is fixture 11, and includes an integral rod portion 22 and a rail portion 25 C-shaped in transverse cross-section having ends 26 forming an opening 27 similar in size and length as rail 15, ends 16 and opening 17. The rod portion 22 of the link 21 is constructed and arranged slidably to fit within the rail 15 but must be of sufficient dimension such that when the link 21 is under tension it will not pass through the ends 16 of the C-shaped rail 15.

The link 21 serves to connect the fixture 11 and the innermost segment 31 in a metal cover 30A as seen in FIG. 2, it being understood that metal cover 30A is represented by segment 31 but consists of six such segments, all identical. In FIG. 1 the metal cover 30A is represented by the segment 31 which has an integral rod shaped portion 32 at one end of the segment 31 and a rail 35 C-shaped in transverse cross-section having ends 36 defining an opening 37 of the rail 35. The rail 35 and the rod shaped portion 32 thereof are connected by an arcuate slat 33 portion thereby to form the segment 31. A plurality of segments 31 form the metal awning cover 30A represented in FIG. 2 with one end of the metal cover 30A being connected to the connecting link 21 and the other end being connected to the fabric awning 43.

As illustrated in FIGS. 2–4, a metal awning cover 30, which is different in respects to be explained from metal cover 30A, is connected to an arm 40 having a motorized head 41 carrying a roller 42 connected to the fabric awning 43. Arm 40 includes a strut 45 connected at the other end thereof to the recreational vehicle sidewall 10, either directly or indirectly, all as well known in the art. The connector 50 includes a pair of rods 51, 52 interconnected by a strip 55 made of a water-impervious material. Preferably the rods 51, 52 are flexible and made of a synthetic organic resin such as polyvinyl chloride or the like. The strip 55 is wrapped around each rod 51, 52 to form three plies 56, 57, 58, maintained in the three ply relationship by means of a pair of parallel rows of stitching 59. The connector 50 serves to interconnect the prior art fixture 11 mounted on a recreational vehicle side wall 10 and the awning cover 30 which is provided with a plurality of prior art segments 31 and a new segment 61. A new segment 61, illustrated in FIGS. 2 and 3, has an arcuate slat portion 63 having a rail 65 on each end thereof C-shaped in transverse cross-section having ends 66 defining an opening 67 in the rail. The segment 61 is different than any prior art segment 31 in that segment 61 has two rails 65 C-shaped in transverse cross-section, whereas the prior art segments 31 had a rail 35 at one end thereof and a rod 32 at the other end thereof.

FIG. 4 shows the invention wherein the connector 50 is positioned with one rod 51 surrounded by the strip 55 positioned in the rail 15 of the fixture 11 and the other rod 52 positioned in the rail 65 of the segment 61. The connector 50 serves to form a hinge connection between the recreational vehicle 10 and the metal awning cover 30 which is comprised of a series of segments 31, 61.

FIG. 4 shows the awning cover 30 in the extended position in which the connector 50 is under tension. When the connector 50 is under tension, the strip 55 is in contact with the ends 16 of the rail 15 and in contact with the ends 66 of the rail 65 thereby to wedge respective rods 51, 52 into the ends 16 and 66 of the respective rails, thereby effectively to seal the openings 17 and 67. This wedging action along with the resilient or elastic nature of the rods 51, 52 and the strip 55 serve to provide a water-tight seal between the ends 16 and 66 of the respective rails 15 and 65 and the strip 50 so as to prevent water from running down the side 10 of the recreational vehicle and around the rail 15 or the rail 65. Previously, rain would contact the link 21 and work its way around either the rail 15 or the rail 25 resulting in leakage underneath the awning cover 30A, which was a nuisance and a detriment to the proper functioning of the slatted metal cover 30A. The flexible rods 51, 52 in cooperation with the woven fabric strip 55 which is preferably of an acrylic chloride material or other suitable synthetic organic resin which is water-impervious and constructed and arranged to withstand outdoor use prevents seepage of water through the connector 50 which forms a water-tight hinge for connection between the vehicle side wall 10 and the metal awning cover 30. Although specific synthetic organic resin materials have been disclosed, the invention is broader in scope than the preferred embodiment and is not meant to be limited to synthetic organic resins.

While there has been described what at present is considered to be the preferred embodiment of the present invention, it will be apparent to those skilled in the art that various modifications and alterations may be made herein without departing from the true spirit and scope of the invention. It is intended that all such variations and modifications are to be covered in the claims appended hereto.

I claim:

1. A flexible connector for connecting a metal awning cover to a vehicle, comprising a flexible water-impervious strip, means for connecting one end of said strip to the vehicle, and means for connecting the other end of said strip to the metal awning cover, whereby when the awning is in use or in an extended position said flexible strip is under tension providing a water-tight seal between the awning cover and the recreational vehicle.

2. The flexible connector set forth in claim 1, wherein said means for connecting said strip to the vehicle and the metal awning cover includes a pair of elongated members connected to the ends of said strip providing a water-tight connection therebetween.

3. The flexible connector set forth in claim 2, wherein said elongated members are flexible rods of a synthetic organic resin.

4. The flexible connector set forth in claim 1, wherein said flexible water impervious strip is a woven fabric.

5. The flexible connector set forth in claim 4, wherein said woven fabric is a synthetic organic resin.

6. In a recreational vehicle having a first longitudinally extending rail C-shaped in transverse cross-section and a roll-up awning having a metal cover with a second longitudinally extending rail C-shaped in transverse cross-section, the combination therewith of a waterproof connector, said connector comprising a pair of rods, each rod being capable of fitting within one of the first and second C-shaped rails, a flexible water-impervious fabric connecting said pair of rods constructed and arranged to provide a watertight connection between the first and second C-shaped rails when said fabric is under tension, whereby water is prevented from flowing between the recreational vehicle and the metal cover for the roll-up awning when the awning is extended and said flexible water-impervious fabric is under tension connecting the recreational vehicle and the roll-up awning metal cover.

7. The water proof connector set forth in claim 6, wherein said rods are flexible.

8. The water proof connector set forth in claim claim 6, wherein each rod has a diameter sufficiently large to be trapped within the C-shaped rails and to be retained therein under tension.

9. The water proof connector set forth in claim 8, wherein each rod has a longitudinal extent substantially equal to the width of said fabric so that said fabric covers substantially all of said rod.

10. In a recreational vehicle having a first longitudinally extending rail C-shaped in transverse cross-section, the combination therewith of a metal cover for a roll-up awning, a second longitudinally extending rail C-shaped in transverse cross-section on said metal cover, a waterproof connector including a pair of rods, each rod being capable of fitting within one of the first and said second C-shaped rails, a synthetic organic resin strip wrapped around each rod forming a flexible multi-ply connection between said rods extending substantially the entire length thereof and forming a watertight hinge therebetween, whereby water is prevented from flowing between the recreational vehicle and said metal cover for the roll-up awning when the awning is extended and said synthetic organic resin strip is under tension connecting the recreational vehicle and said roll-up awning metal cover.

11. The combination set forth in claim 10, wherein said rods are flexible.

12. The combination set forth in claim 10, wherein said strip is wrapped to form three plies between said rods.

13. The combination of claim 12, wherein said plies are sewn together.

14. The combination of claim 13, wherein said stitching forms a pair of spaced apart parallel rows.

15. The combination of claim 10, wherein said metal cover has a plurality of slats each having a rail C-shaped in transverse cross section at one end thereof, the slat receiving one of said rods having two rails C-shaped in transverse cross-section, each of said rails having the same configuration in transverse cross-section one for connection to said strip the other for connection to another slat of said metal cover.

16. The combination of claim 15, wherein said slat having two rails C-shaped in transverse cross section has an arcuate portion extending between said two rails.

* * * * *